United States Patent [19]

Kuster et al.

[11] Patent Number: 4,930,864
[45] Date of Patent: Jun. 5, 1990

[54] DOMED SEGMENTED LENS SYSTEMS

[75] Inventors: Walter Kuster, Tugen; Hans J. Keller, Staefe, both of Switzerland

[73] Assignee: Eltec Instruments, Inc., Daytona Beach, Fla.

[21] Appl. No.: 227,277

[22] Filed: Aug. 2, 1988

[51] Int. Cl.$^5$ .................. G02B 27/00; G08B 13/18
[52] U.S. Cl. .................... 350/167; 250/221; 250/342; 340/567; 350/1.1
[58] Field of Search ................ 350/167, 1.1; 250/338.2, 342, 353, 221, 203 R, 203 CT; 340/567

[56] References Cited

U.S. PATENT DOCUMENTS

| | | |
|---|---|---|
| 3,629,592 | 12/1971 | Courrier . |
| 3,984,178 | 10/1976 | Bergqvist . |
| 4,057,098 | 11/1977 | Maine .................................. 350/167 |
| 4,080,534 | 3/1978 | Guggenheim et al. .............. 350/1.1 |
| 4,087,688 | 5/1978 | Keller . |
| 4,318,089 | 3/1982 | Frankel et al. . |
| 4,523,095 | 6/1985 | Keller-Steinbach ................. 250/342 |
| 4,606,600 | 8/1986 | Schmidt .............................. 350/1.1 |
| 4,717,821 | 1/1988 | Messiou .............................. 250/221 |
| 4,769,545 | 9/1988 | Frader ................................. 250/353 |

*Primary Examiner*—Bruce Y. Arnold
*Assistant Examiner*—J. Ryan
*Attorney, Agent, or Firm*—Duckworth, Allen, Dyer & Doppelt

[57] ABSTRACT

An improved optical assembly which provides a panoramic field of view for infrared motion detection. In one form of the invention the optical assembly comprises a spherical section having an inner surface and an outer spherical surface, the outer spherical surface having a radius of curvature centered in a focal region which is suitable for placement of an infrared detector. The inner surface of the spherical section comprises a plurality of circular convex lenses, each lens having an optical axis passing through the focal region. The combination of the outer spherical surface with each circular convex lens forms a biconvex lens having a focal point in the focal region. Radiation received by each biconvex lens from a zone in the field of view is focused in the focal region for sensing by the infrared detector.

19 Claims, 1 Drawing Sheet

DOMED SEGMENTED LENS SYSTEMS

This application relates in general to a wide-angle optic for a light sensitive receiver and, in particular, to an improved optical assembly which provides a panoramic field of view for passive infrared motion detection.

BACKGROUND OF THE INVENTION

Light sensitive motion detection devices typically comprise an optic or catoptric collecting assembly for maximizing signal gain and an electro optic sensor which receives a radiation signal. The sensor is coupled to electronic circuitry for detecting fluctuations in sensor output which result from changes in the radiation signal. Many passive infrared detection devices, such as the type used in security systems, monitor the movement of a body through an optical field of view based on emission of infrared radiation. Because persons and objects normally exhibit temperature differentials with respect to the surrounding background they emit infrared radiation levels which generally differ from the background levels. Consequently, their motion can be detected with electronic circuitry because they produce fluctuations in radiation intensity when passing through the optical field. By providing appropriate optical gain and signal discrimination small fluctuations in radiation intensity, e.g., corresponding to temperature differentials of less than 1° C., can be detected. In order to enhance this sensitivity many passive infrared detection systems use precision mirrors or other collecting optics to focus radiation onto a parallel opposed dual pyroelectric detector comprising two spaced apart optical sensing elements. The pyroelectric detector will produce a defined signal from a moving target while cancelling common mode signals received simultaneously by both sensing elements. In addition, two stage optical filtering is sometimes required in order to narrow the frequency band of the optical response. This filtering eliminates background effects which may cause the intensity of the infrared radiation to fluctuate and induce a spurious response from the motion detection device. Signal processing may also be used to discriminate very weak signals caused by a moving target from unwanted signals caused by wind, clouds and precipitation.

The systems of lenses and mirrors which have been used in the past to provide high signal sensitivity in passive infrared motion detectors have provided a substantially planar and relatively narrow field of view. As a result motion detectors are usually positioned to survey a substantially horizontal field of view. For example, a detection device may monitor motion in as many as 20 discrete horizontal zones wherein each zone forms a relatively small solid angle, e.g., on the order of seven millisteradians. This solid angle would only provide a cross sectional area of approximately 1.3 square meters at a distance of ten meters in front of the detector. Although motion detectors which sense movement in a plurality of discrete horizontal zones are capable of monitoring a relatively wide field of view, e.g. 60°, the vertical height of the zone is typically limited to approximately 1 meter at a distance of 15 meters from the detector.

At times it is desirable to monitor activity at close distances over relatively large surface areas that do not conform to a narrow horizontal field of view. For example, optical collecting devices used in the past for motion detection have not provided the panoramic field of view necessary for simultaneously monitoring an entire floor area in a room. This is because motion detection systems which monitor changes in infrared radiation over large solid angles, e.g., up to two pi steradians, have not been available.

In order to reliably detect motion throughout an entire room, e.g., with a ceiling mounted detector, the room must be divided into a large number of discrete detection zones. This requirement for a large number of zones, e.g., as many as one hundred zones in a room having a 3 meter ceiling height, limits the types of optical assemblies which can be used to collect radiation signals over a large solid angle. For example, segmented mirrors would require very complex optics in order to provide more than twenty zones. Fresnel lenses, while capable of providing a very large number of zones, cannot provide a wide field of view in two dimensions because a Fresnel lens cannot be curved along two transverse axes.

It is not believed that other mirror systems, such as, for example, deflecting mirror systems and multiple reflection mirror systems can provide a sufficient number of zones and an acceptable level of gain in order to reliably operate a ceiling mounted motion detection monitor. For a mirror system to provide a suitable number of zones there would have to be a complex arrangement of reflective surfaces and the reflectors would have to be positioned off of the optical axis. Otherwise the detector will obstruct radiation paths to the mirrors. Furthermore, significant signal loss may result from the multiple reflection mirror systems. Therefore it is desirable to have an improved optical assembly which focuses radiation from a large number of zones distributed over a large solid angle, e.g., two pi steradians, in order to provide a panoramic field of view for motion detection.

SUMMARY OF THE INVENTION

It is an object of the present invention to provide an optical assembly which condenses radiation from a panoramic field of view upon a central point for detection by an optical sensor.

It is another object of the invention to provide a segmented lens system which directs radiation from a plurality of discrete optical zones distributed about a panoramic field of view to a receiving surface.

It is a further object of the invention to provide a segmented lens system which collects radiation signals from solid angles ranging up to two pi steradians.

Generally, there is provided an improved optical assembly for collecting radiation from zones distributed about a large solid angle. The assembly comprises a plurality of convex lenses distributed about a spherical surface, the optical axis of each lens intersecting a receiving surface suitable for positioning an optical detector.

DETAILED DESCRIPTION OF THE PREFERRED EMBODIMENT

Figure 1:
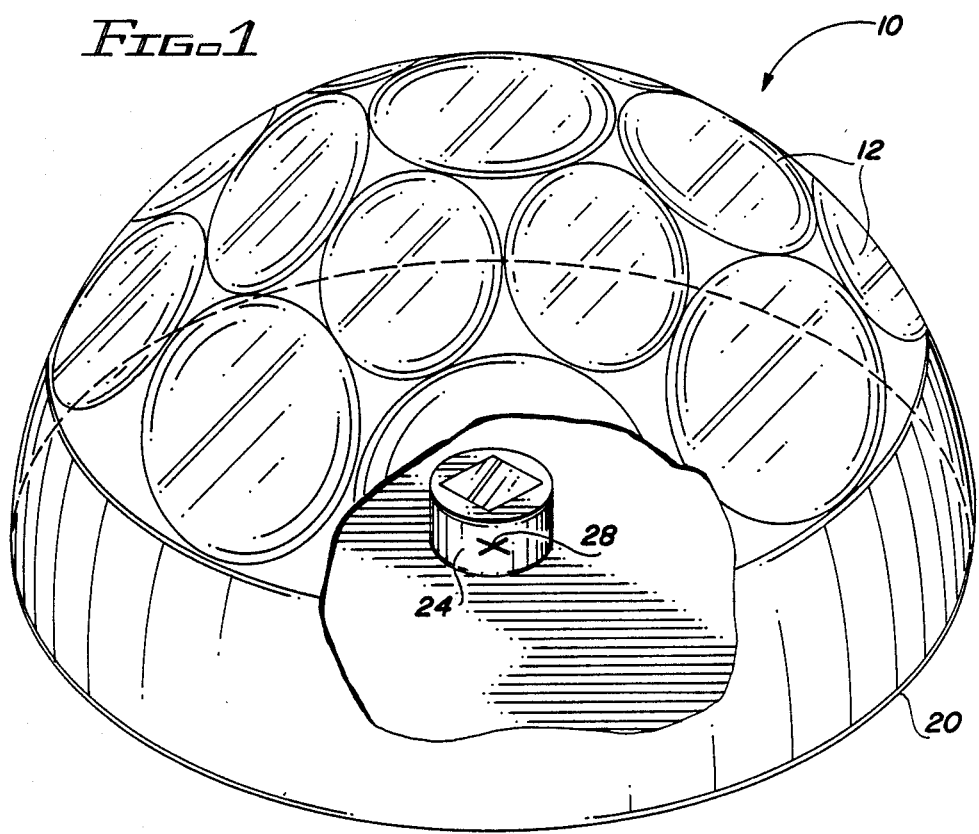
FIG. 1 is a side perspective view of the inventive optical assembly with an optical detector positioned to receive radiation signals in the focal region of the optical assembly.
Figure 2:
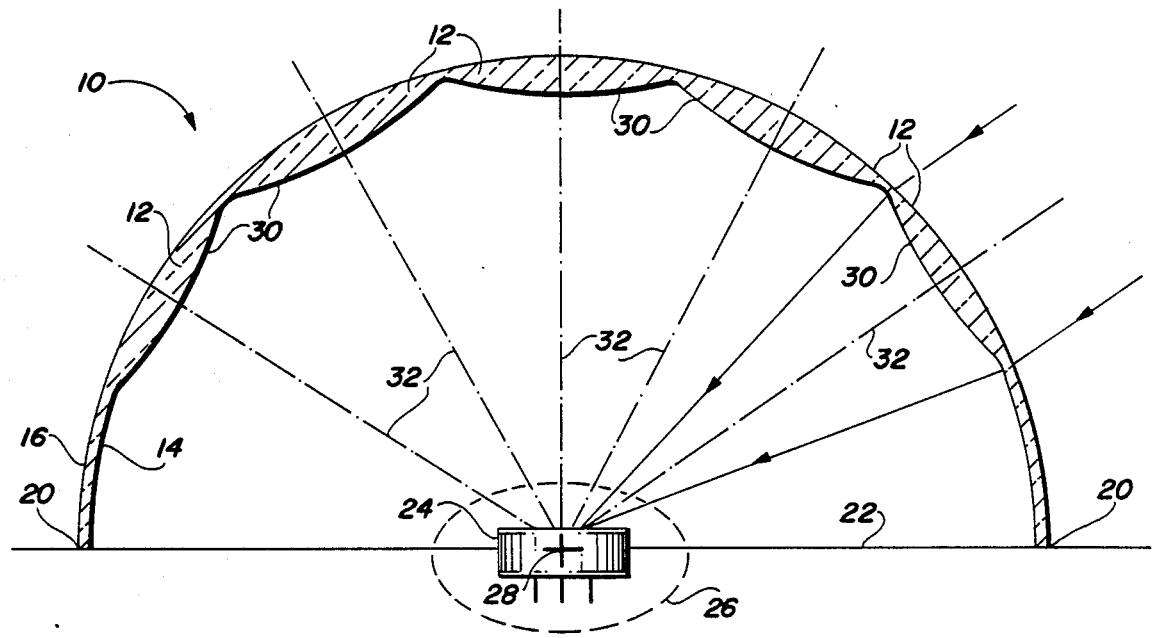
FIG. 2 is a sectional view of the inventive optical assembly.

With reference to FIGS. 1 and 2 there is illustrated an optical assembly 10 comprising a plurality of lenses 12 formed between inner and outer concentric surfaces 14 and 16. In a preferred embodiment of the invention the outer surface 16 is a hemisphere having a circular edge 20 which defines a plane 22. However, the outer surface 16 may be a spherical section which is smaller than a hemisphere. An optical detector 24 is positionable in a small focal region 26. The focal region 26, indicated by phantom lines in FIG. 1, lies on both sides of the plane 22 and is positioned about the spherical center 28 of the outer surface 16. The distance from the spherical center 28 to the outer surface 16 is the radius of curvature of the outer surface 16. The inner surface 14 comprises a plurality of circular convex subsurfaces 30, each subsurface 30 having a radius of curvature equal and opposite to that of the outer surface 16. As a result, the combination of the outer surface 16 and each subsurface 30 forms a circular biconvex lens 12 each having a single optical axis 32. Each optical axis 32 passes through the focal region 26. When the optical assembly 10 is formed from a material having an index of refraction of 1.5, such as polyethylene plastic, the focal point of each lens will be in the focal region 26 near the spherical center 28. In an ideal configuration of the optical assembly 10 the optical axis 32 of each lens 12 passes through the spherical center 28 so that the focal point of each lens coincides with the spherical center 28. However, it is only essential to the operation of the invention that the optical axis 32 of each lens 12 pass through the focal region 26 in order to be received by the optical detector 24.

In the preferred embodiment of the invention the entire optical assembly 10 is molded from polyethylene plastic and the individual lenses 12 are six millimeters in diameter, each having a thickness of approximately 0.4 millimeters. This lens thickness results in a tolerable level of infrared absorption by the polyethylene plastic.

The preferred embodiment of the inventive optical assembly operates in the following manner. Each lens 12 receives radiation from a distinct zone centered about a corresponding optical axis 32. The plurality of lenses 12 receive radiation from a panoramic optical field covering a solid angle up to two pi steradians. Each lens focuses radiation from its corresponding zone in the focal region 26. An optical detector 24, such as a parallel opposed dual pyroelectric detector, when placed in the focal region 26 and coupled with electronic detection circuitry, will provide a fluctuating electrical signal in response to changes in radiation levels provided to the focal region 26 by the plurality of lenses 12. Thus, fluctuations in infrared radiation intensity, caused by the motion of a person or object within the panoramic optical field, will cause fluctuation in the electrical signal provided by the optical detector 24.

There has been described an optical assembly suitable for collimating radiation from a plurality of discrete optical zones distributed about a panoramic field of view ranging up to a solid angle of two pi steradians. The present invention is particularly suitable for use in a motion detection device which requires a panoramic view over a large solid angle such as would be required for surveillance over the floor area in an entire room with a single ceiling mounted detection device. The invention is not limited to the embodiments herein described as examples, but can be subject to modifications within the scope of the following claims.

What is claimed is:

1. An optical assembly for providing a panoramic field of view about a central point in a focal region for sensing radiation, the assembly comprising:
   a spherical section having an outer spherical surface and an inner surface, the outer surface having a radius of curvature originating at the central point and the inner surface comprising a plurality of convex lenses, each lens having an optical axis passing through the focal region.

2. The optical assembly of claim 1 wherein the inner surface of each convex lens has a radius of curvature equal and opposite to the outer spherical surface.

3. The optical assembly of claim 2 wherein the outer spherical surface is a hemisphere.

4. The optical assembly of claim 2 wherein the optical axis of each lens passes through the central point.

5. The optical assembly of claim 2 wherein the spherical section has an index refraction equal to 1.5.

6. The optical assembly of claim 2 wherein the spherical section is formed of polyethylene plastic.

7. An optical assembly for providing a panoramic field of view about a central point in a focal region for sensing radiation, the assembly comprising:
   a plurality of circular lenses each having an optical axis, an inner surface and an outer surface, said lenses being arranged in a spherical matrix having a radius of curvature originating at the central point with each optical axis passing through the focal region; and wherein
   the outer surface of each circular lens is convex and has a radius of curvature originating in the focal region.

8. The optical assembly of claim 7 wherein the outer surface of each lens is convex and is formed along the radius of curvature of the spherical matrix.

9. The optical assembly of claim 7 wherein each lens is biconvex.

10. The optical assembly of claim 9 wherein the outer surface of each biconvex lens has a radius of curvature originating at the central point and the inner surface of each biconvex lens has a radius of curvature equal and opposite to the radius of curvature of the outer lens surfaces.

11. The optical assembly of claim 9 wherein each biconvex lens has an index of refraction equal to 1.5.

12. The optical assembly of claim 11 wherein the spherical matrix forms a hemisphere.

13. The optical assembly of claim 9 wherein each convex lens is formed from polyethylene plastic.

14. The optical assembly of claim 13 wherein each polyethylene plastic lens has a maximum thickness of 0.5 mm in order to transmit infrared radiation to the focal region.

15. An optical assembly for providing a panoramic field of view about a radiation sensor positioned in a focal region for sensing radiation, the assembly comprising:
   a first spherical surface having a radius of curvature originating at the radiation sensor; and
   a plurality of circular biconvex lenses each having an inner surface directed toward the radiation sensor and an outer surface directed away from the radiation sensor, said outer lens surfaces being evenly distributed along the first surface; and wherein the outer surface of each lens has the same radius of curvature as the first surface.

16. The optical assembly of claim 15 wherein the inner and outer surfaces of each lens have opposite radii of curvature.

17. The optical assembly of claim 16 wherein the first spherical surface is a hemisphere.

18. A segmented lens sysem for focusing incoming radiation from a panoramic field of view about a central point in a focal region comprising:
    a spherical section having an outer spherical surface and an inner surface, the outer spherical surface ahving a single radius of curvature about the central point;
    a plurality of convex lenses formed in the spherical section between the outer surface and the inner surface, each convex lens hving an optical axis passing through the focal region.

19. A panoramic infrared detector comprising:
    an infrared detector element;
    a spherical section about the infared detector, the spherical section having an outer spherical surface and an inner surface, the outer spherical surface having a single radius of curvature about the infrared detector element;
    a plurality of convex lens formed in the spherical section between the outer spherical surface and the inner surface; and wherein
    the optical axis of each lens intersects the detector element.

* * * * *